(12) United States Patent
Krishna Akkapeddi

(10) Patent No.: US 12,706,882 B2
(45) **Date of Patent: *Aug. 11, 2026**

(54) SYSTEM AND METHODS FOR CLOUD-BASED VIRTUAL PRIVATE SECURED CONTAINED COMMUNICATION PORTAL

(71) Applicant: BANK OF AMERICA CORPORATION, Charlotte, NC (US)

(72) Inventor: Naga Vamsi Krishna Akkapeddi, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/952,847

(22) Filed: Nov. 19, 2024

(65) Prior Publication Data

US 2025/0080499 A1 Mar. 6, 2025

Related U.S. Application Data

(63) Continuation of application No. 17/970,963, filed on Oct. 21, 2022, now Pat. No. 12,231,406.

(51) Int. Cl.
*H04L 9/40* (2022.01)

(52) U.S. Cl.
CPC ...... *H04L 63/0272* (2013.01); *H04L 63/0236* (2013.01); *H04L 63/0876* (2013.01)

(58) Field of Classification Search
CPC ............. H04L 63/0272; H04L 63/0236; H04L 63/0876
See application file for complete search history.

(56) References Cited

U.S. PATENT DOCUMENTS

| | | | |
|---|---|---|---|
| 8,117,281 | B2 | 2/2012 | Robinson |
| 9,041,765 | B2 | 5/2015 | Periyannan |
| 9,071,658 | B2 | 6/2015 | McConnell |
| 9,083,769 | B2 | 7/2015 | Beel |
| 9,166,979 | B2 | 10/2015 | Hoard |
| 9,195,971 | B2 | 11/2015 | McConnell |
| 9,722,986 | B2 | 8/2017 | Brands |
| 9,774,658 | B2 | 9/2017 | Borzycki |
| 10,044,871 | B2 | 8/2018 | Bargetzi |

(Continued)

*Primary Examiner* — Vu V Tran
(74) *Attorney, Agent, or Firm* — Moore & Van Allen PLLC; Nicholas C. Russell

(57) ABSTRACT

Systems, computer program products, and methods are described herein for a cloud-based virtual private secured contained communication portal. The present disclosure is configured to receive a request from a user device to connect to one or more entity representatives; receive and authenticate authentication credentials received from the user device; generate a virtual private network (VPN) configuration for the user device; generate a secure application programming interface (API) call from the user device to one or more entity cloud services based on information contained in the request to form an operable connection between the user device and the one or more entity representatives; and block all incoming or outgoing network connections on the user device via the VPN configuration other than the those necessary to connect to the one or more entity cloud services while the user device is operably connected to the one or more entity representatives.

20 Claims, 6 Drawing Sheets

(56) References Cited

U.S. PATENT DOCUMENTS

| | | | | |
|---|---|---|---|---|
| 10,252,160 | B2 | 4/2019 | Dawson | |
| 10,291,465 | B2 | 5/2019 | Rjeili | |
| 10,510,050 | B2 | 12/2019 | Meushar | |
| 10,530,933 | B2 | 1/2020 | Kleiner | |
| 10,694,144 | B2 | 6/2020 | Shaya | |
| 10,698,569 | B2 | 6/2020 | Bugenhagen | |
| 10,869,001 | B2 | 12/2020 | Periyannan | |
| 11,403,595 | B2 | 8/2022 | Platt | |
| 11,460,970 | B2 | 10/2022 | Agarawala | |
| 2015/0372982 | A1* | 12/2015 | Herle | H04L 63/0272 726/15 |
| 2016/0261564 | A1* | 9/2016 | Foxhoven | H04L 63/20 |
| 2016/0302666 | A1 | 10/2016 | Shaya | |
| 2018/0095637 | A1 | 4/2018 | Valdivia | |
| 2021/0399911 | A1 | 12/2021 | Jorasch | |
| 2023/0269160 | A1* | 8/2023 | Mineikis | H04L 63/0464 |
| 2024/0250934 | A1* | 7/2024 | Jowett | G06F 21/335 |

* cited by examiner 130
106
112
114
108
104
111
116
102

SYSTEM AND METHODS FOR CLOUD-BASED VIRTUAL PRIVATE SECURED CONTAINED COMMUNICATION PORTAL

CROSS-REFERENCE TO RELATED APPLICATION

This application is a continuation application of and claims priority to U.S. Non-provisional application Ser. No. 17/970,963 filed Oct. 21, 2022, and of the same title; the contents of which are hereby incorporated by reference in their entirety.

FIELD

Example embodiments of the present disclosure relate to system and methods for cloud-based virtual private secured contained communication portals.

BACKGROUND

Customers perform resource transfers online, in-person, or on calls via various devices. There are scenarios where customers need help during remote interactions to proceed with resource transfers. In conventional systems, customers can call support for assistance or follow recommended practices, if they exist. It would be advantageous for customers to have a secure room to discuss technical assistance, problem solutions, as well as any personal and other resource needs.

Applicant has identified a number of deficiencies and problems associated with cloud-based virtual private secured contained communication portals. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for cloud-based virtual private secured contained communication portals. The present invention addresses the above needs by providing systems and methods where customers can be authenticated via a specific virtual room tokens issued during service registration, or a device specific token issued via a cloud connection. It is understood that a virtual private room can be specifically assigned to either the customer or a generic conference room with blanket privacy protections for all users who may join. Room tokens are managed over the cloud and can be maintained by re-authenticating and authorizing the customer via key exchange. Furthermore, secure sessions allow the usage of entity applications as well as video conference, wherein and all communications such as document exchange and conversations are encrypted for security purposes. When the customer is authenticated and authorized, and there is a need is for video conference, the system checks support associate availability across all the channels and will assign based on availability and specificity of the customer request or issue. In this way, the customer can take advantage of their own device and perform resource transfers and obtain assistance with resource transfers or account issues. It is understood that, depending on the resource transfer type, a specific application programming interface (API) call can be sent in order to later determine which support associate availability should be checked.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive a request to receive a request from a user device to connect to one or more entity representatives; analyze the request to determine a device identifier and customer identification number; access an entity database and retrieve resource transfer history data and resource account data for the customer identification number; generate, near-real-time, a virtual private network (VPN) configuration for the user device; and generate a secure application programming interface (API) call from the user device to one or more entity cloud services based on information contained in the request to form an operable connection between the user device and the one or more entity representatives.

In some embodiments, the invention is further configured to: block all incoming or outgoing network connections on the user device via the VPN configuration other than the those necessary to connect to the one or more entity cloud services while the user device is operably connected to the one or more entity representatives.

In some embodiments, the VPN configuration further comprises requesting device permissions on the user device to control one or more background applications.

In some embodiments, the invention is further configured to select a subset of the one or more entity representatives based on information contained in the request.

In some embodiments, the invention is further configured to select a subset of the one or more entity representatives based on the resource transfer history data the resource account data identified using the customer identification number.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
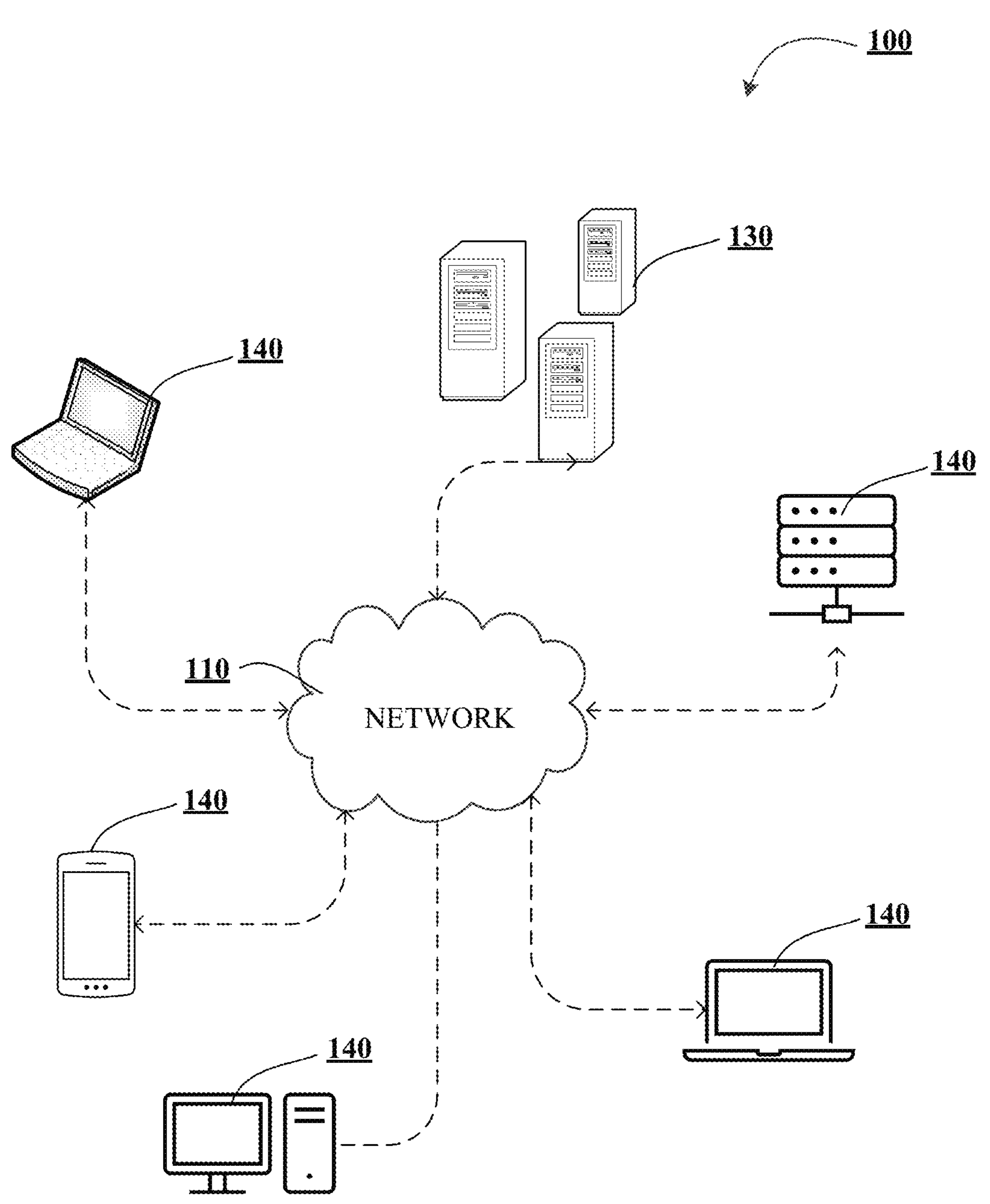
Figure 1B:
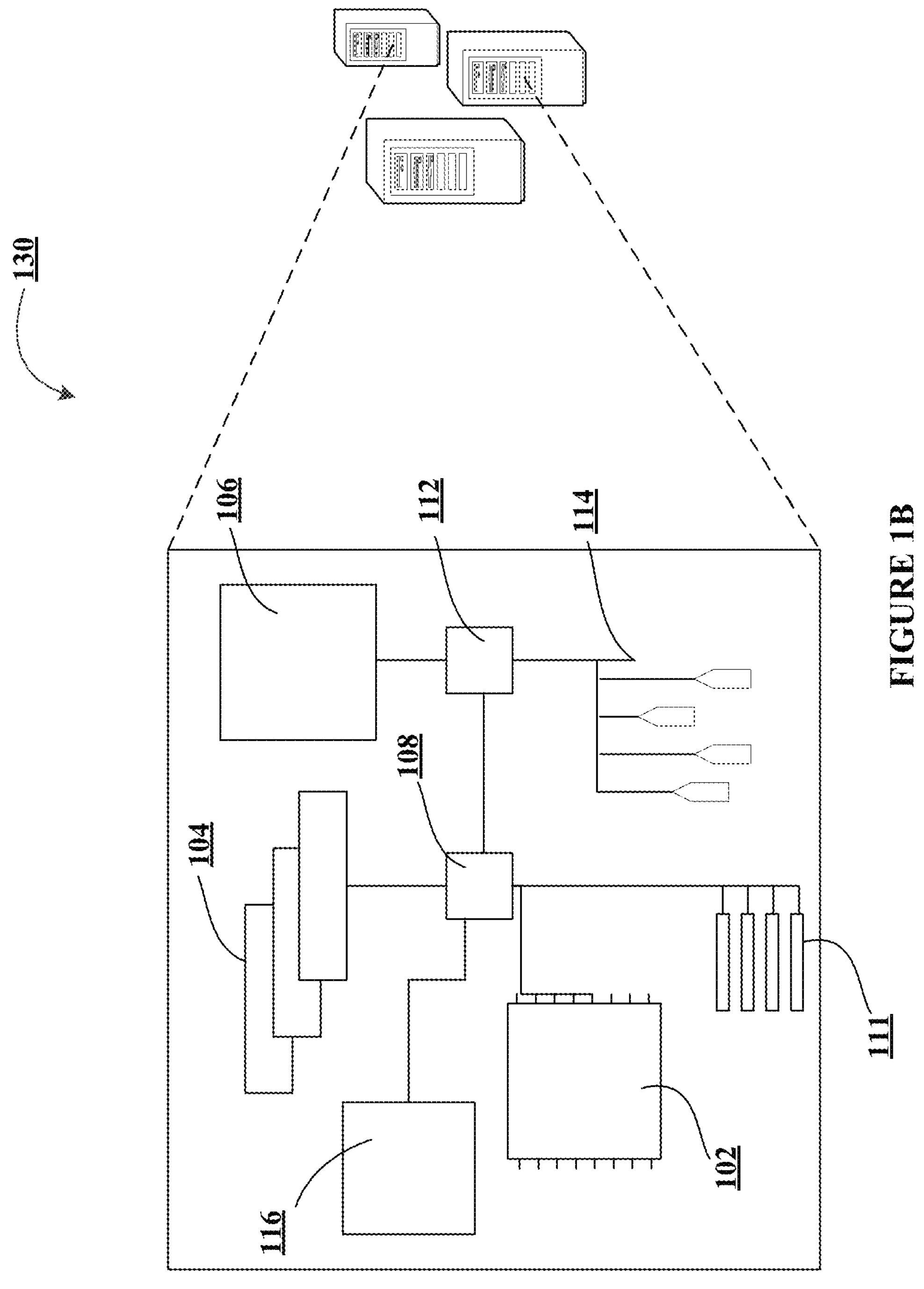
Figure 1C:
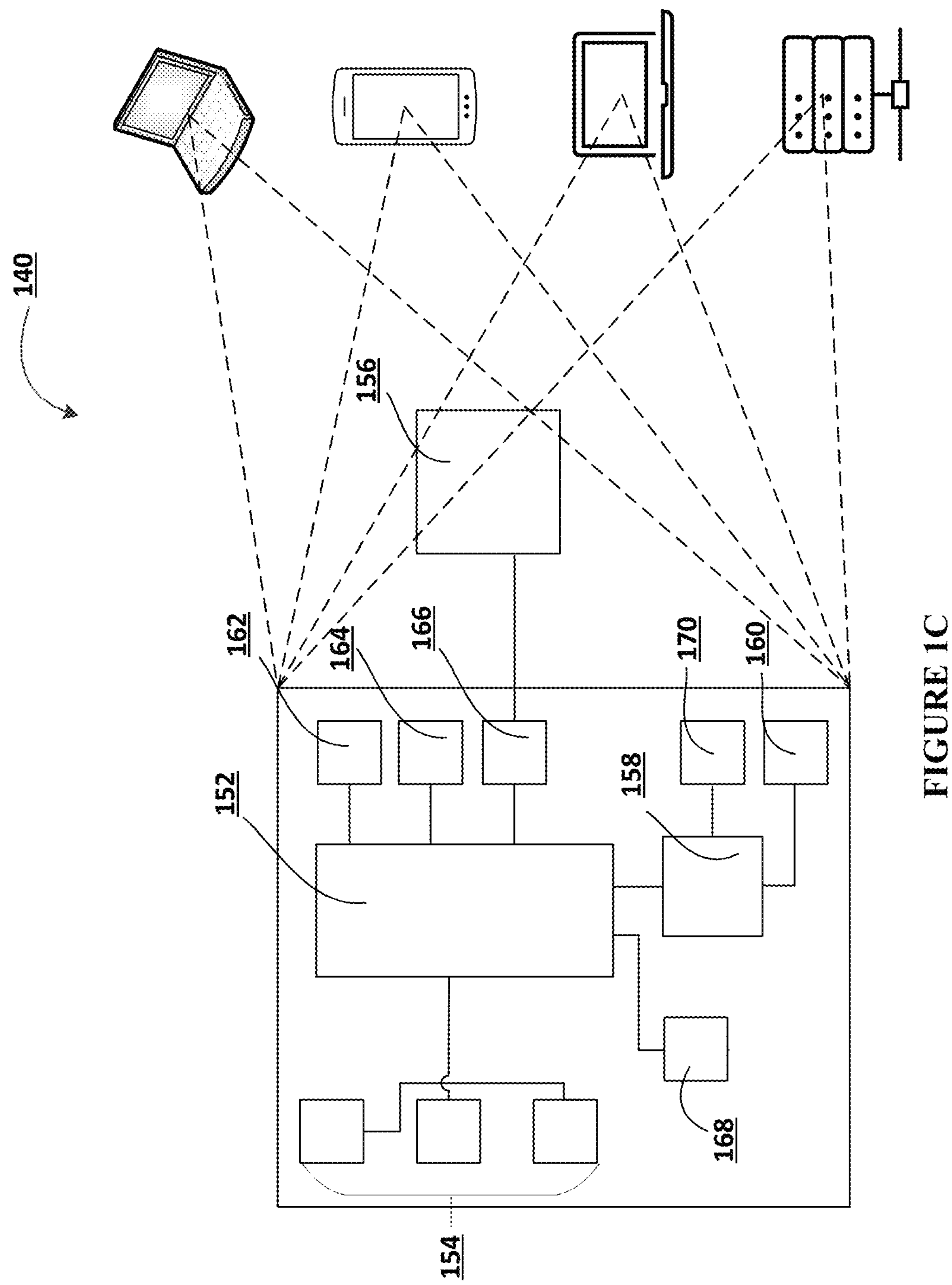
Figure 2:
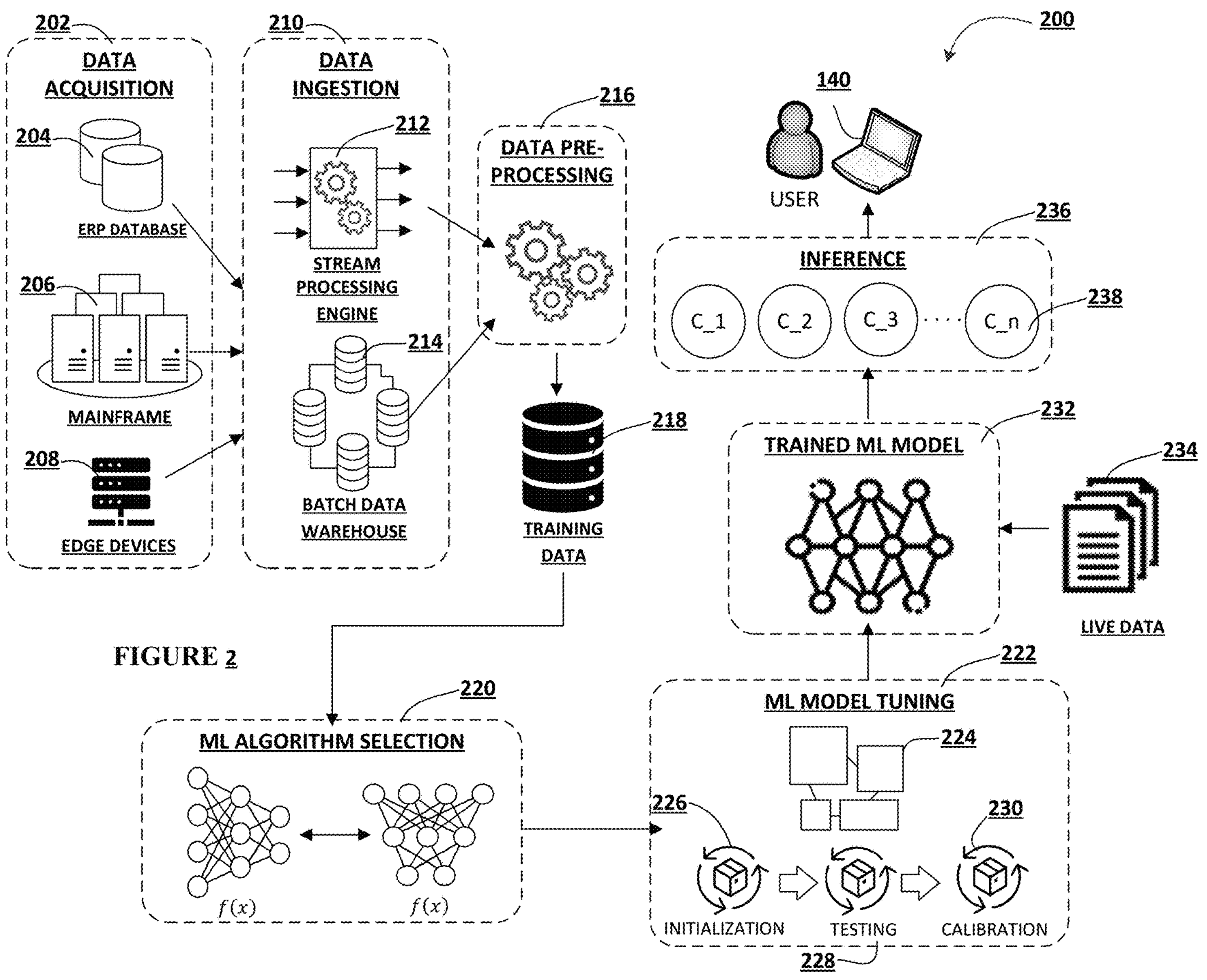
Figure 3:
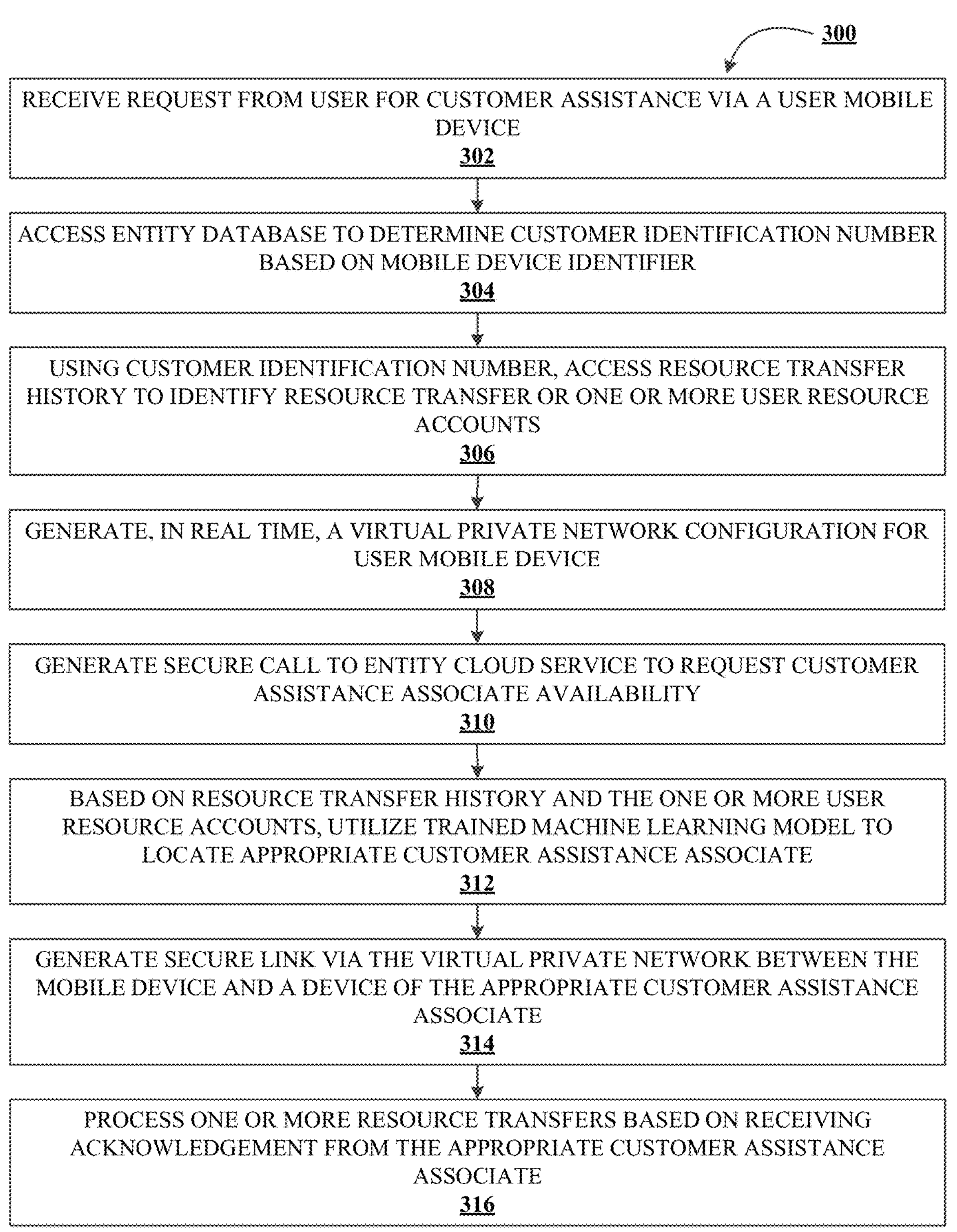
Figure 4:
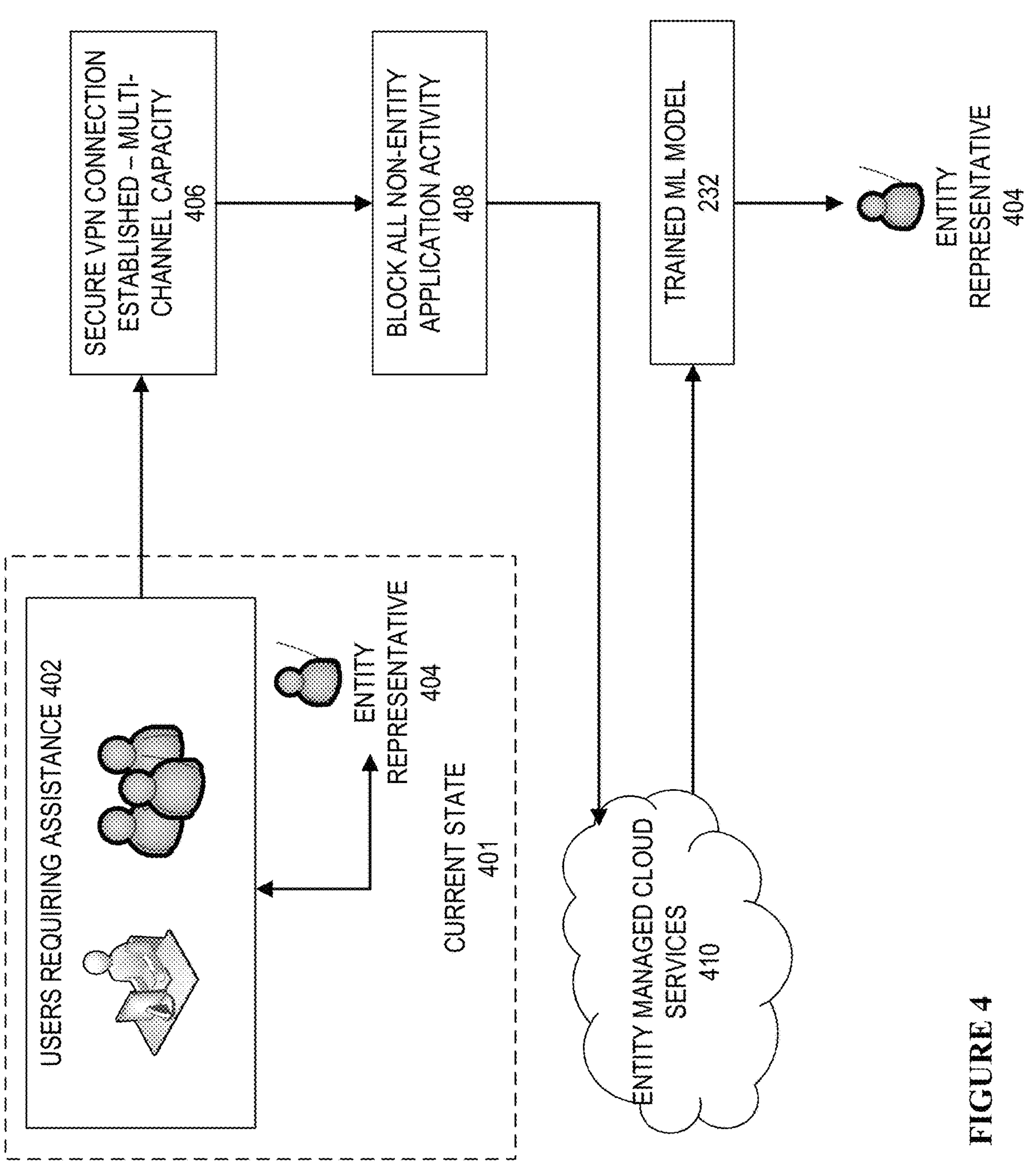

FIGS. 1A-1C illustrate technical components of an exemplary distributed computing environment for cloud-based virtual private secured contained communication portals, in accordance with an embodiment of the disclosure;

FIG. 2 illustrates an exemplary machine learning (ML) subsystem architecture 200, in accordance with an embodiment of the invention;

FIG. 3 illustrates a process flow for cloud-based virtual private secured contained communication portals, in accordance with an embodiment of the disclosure; and FIG. 4 illustrates a high-level process flow diagram for comparison of current state versus cloud-based virtual private secure communication portal functionality, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein a "resource transfer" may refer to a transaction of resources between user accounts, entity accounts, merchant accounts, or any combination thereof. A resource transfer may occur over a number of payment channels including automated clearing house (ACH), debit, real time payment (RTP), peer-to-peer, or the like. Furthermore, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Customers perform resource transfers online, in-person, or on calls via various devices. There are scenarios where customers need help during remote interactions to proceed with resource transfers. In conventional systems, customers can call support for assistance or follow recommended practices, if they exist. It would be advantageous for customers to have a secure room to discuss technical assistance, problem solutions, as well as any personal and other resource needs.

Systems, methods, and computer program products are provided for cloud-based virtual private secured contained communication portals. The present invention addresses the above needs by providing systems and methods where customers can be authenticated via a specific virtual room tokens issued during service registration, or a device specific token issued via a cloud connection. It is understood that a virtual private room can be specifically assigned to either the customer or a generic conference room with blanket privacy protections for all users who may join. Room tokens are managed over the cloud and can be maintained by re-authenticating and authorizing the customer via key exchange. Furthermore, secure sessions allow the usage of entity applications as well as video conference, wherein and all communications such as document exchange and conversations are encrypted for security purposes. When the customer is authenticated and authorized, and there is a need is for video conference, the system checks support associate availability across all the channels and will assign based on availability and specificity of the customer request or issue. In this way, the customer can take advantage of their own device and perform resource transfers and obtain assistance with resource transfers or account issues. It is understood that, depending on the resource transfer type, a specific application programming interface (API) call can be sent in order to later determine which support associate availability should be checked.

What is more, the present disclosure provides a technical solution to a technical problem. As described herein, the technical problem includes the lack of ability for customers to securely connect with support associates or entity representatives via multiple channels or devices in a streamlined fashion. The technical solution presented herein allows for secure virtual private networking in the specific context of resource transfers. In particular, the ability to authenticate a user seamlessly and provide immediate access to entity support associates trained to handle specific resource transfer issues represents an improvement over existing solutions to providing support to financial customers (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for cloud-based virtual private secured contained communication portals 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for cloud-based virtual private secured contained communication portals, in accordance with an embodiment of the disclosure. As shown in block 302, the process begins wherein the system receives a request from a user for customer assistance via a mobile device. In some embodiments, the request may be made via an mobile application installed on the user device which is managed by the entity system, such as a mobile banking application, or the like. Additionally, the request may contain certain identifying information such as a customer identification number (customer ID), device identification number (device ID), a resource transfer identification number (resource transfer ID, transaction ID, or the like), one or more resource account identification numbers (account ID(s)), or the like. AS shown in block 304, the system may use one or more identifiers embedded in the request to cross reference with an entity database to determine further information. For instance, the request may contain a device ID, application session identifier, or the like, and the system may cross reference one or both of these data points with the entity database information in order to determine a customer ID. As further indicated in block 306, the system may use the customer ID to locate a resource transfer history for a specific user or customer. The resource transfer history may indicate one or more resource transfers conducted in the past, being attempted by the user currently, and the system may identify one or more resource accounts associated with the resource transfer history of the particular user or customer. The resource accounts associated with the resource transfer history may include one or more accounts owned by the user or customer, one or more accounts linked to an account owned by the user or customer (a family member's account, a dependent's account, or the like).

In response to the request for customer assistance, the system may generate, in real-time or near-real-time, a virtual private network configuration for the user mobile device, as shown in block 308. The virtual private network configuration may be stored on the user's mobile device for future use in additional user requests. It is understood that the configuration may request certain device permissions to control network access to the user mobile device while the virtual private network configuration is active. For instance, in order to connect the user over a video, audio, or text channel of communication to discuss sensitive resource account details, the system may utilize the virtual private network configuration in order to block incoming or outgoing network traffic on the user mobile device other than network traffic to and from the system described herein. In this way, the system can ensure that no sensitive resource account data is being shared, monitored, or manipulated by other active applications or network services during the user's interaction with a customer assistance associate.

Next, as shown in block 310, the system may generate a secure call via a user-specific application programming interface (API) to request customer assistance associate availability. In doing so, the system may include details from the customer request, such as resource transfer ID, resource account ID(s), a subset of resource transfer history, or the like. Based on the resource transfer ID, resource account ID(s), or the subset of resource transfer history, the system may utilize the trained machine learning model 232 in order to determine an appropriate customer assistance associate, as shown in block 312.

For instance, the customer request may indicate that the user is attempting a transaction related to a particular type of resource account, such as a checking account, or the like. In some embodiments, the customer request may indicate that the channel of resource transfer is a debit card, or the like. As such, the machine learning model may analyze all available customer assistance associates to locate an available associate experienced in dealing with checking account or debit resource transfers in order to best assist the user with completing the resource transfer in question. It is understood that the machine learning model 232 may take a number of other data points into account, such as any customer assistance associates that the user has interacted with before, the user's resource transfer history and any issues, resolutions, customer feedback, or the like. The machine learning model 232 may also process data related to other, similarly situated users, such as users in the same geographic region, or the like, in order to connect the user with associates in the same region, provide the customer assistance associate with talking points about the region, or the like, in order to improve the user experience with the customer assistance associate. The machine learning model may also take into account various user preferences for preferred communication channel, such as video call, audio call, text chat, or the like, and may generate a recommendation or offer to connect the user with a customer assistance associate with the equipment or training to conduct a service call in the user's preferred channel of communication.

Moving to block 314, the system may generate a secure link via the virtual private network (VPN) configured on the user mobile device. The secure link is generated between the user mobile device and the appropriate customer assistance associate as determined by the trained machine learning model 232. In some embodiments, as shown in block 316, the system may process one or more resource transfers based on receiving acknowledgement from the customer assistance associate during or after the service session with the user or customer. For instance, in some embodiments, the user or customer may provide additional information required to show that the user is authorizes a resource transfer above an amount that is a standard deviation from the historical mean of resource transfer values based on the resource transfer history of one or more resource accounts owned and managed by the user. Transactions outside a standard deviation or above a pre-set threshold amount may be initially flagged by the system as potentially malfeasant, or the like, and the user or customer may reach out to the system for assistance with confirming and authorizing the resource transfer. It is understood that this is only one exemplary embodiment of a result of an interaction between the user or customer and the customer assistance associate. Various other account management actions may be authorized and processed as a result of the interaction between the user or customer and the customer assistance associate (e.g., resource transfers between a user account and an external account, opening of a new resource account, closing of a resource account, reallocation of resources between resource vehicles, enrollment in one or more investment products, screening for certain borrowing products, or the like).

FIG. 4 illustrates a high-level process flow diagram for comparison of current state versus cloud-based virtual private secure communication portal functionality, in accordance with an embodiment of the disclosure. As shown in the upper left-hand corner of FIG. 4, the dashed lines signify the current state 401, wherein one or more users requiring assistance 402 may contact an entity representative, such as a customer assistance associate, either remotely via a conventional network connection or in-person at a brick-and-mortar location where the users may be placed in a queue to wait to speak with a qualified entity representative 401. The process flow outside of the dashed lines of the current state 401 indicate the process flow of the current state of the present invention. As shown in block 406, a secure VPN connection is established between the users requiring assistance 402 and entity managed cloud services 410. In doing so, the system may block all non-entity application activity, as indicated in block 408, while still enabling multi-channel communication capacity between the users requiring assistance 402 and the entity managed cloud services 410. The system may utilize the trained machine learning (ML) model 232 in order to locate an appropriate and immediately available entity representative, avoiding situations where the users requiring assistance 402 have to spend time in a queue, and further avoiding any situations where unsecure communications may be intercepted, altered, monitored, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for cloud-based virtual communication portals, the system comprising:

at least one memory device with computer-readable program code stored thereon; and at least one processing device operatively coupled to the at least one memory device, wherein the computer-readable code is configured to cause the at least one processing device to:

receive a request from a user device to connect to one or more entity representatives;

receive and authenticate authentication credentials received from the user device;

generate a virtual private network (VPN) configuration for the user device;

generate a secure application programming interface (API) call from the user device to one or more entity cloud services based on information contained in the request to form an operable connection between the user device and the one or more entity representatives; and block all incoming or outgoing network connections on the user device via the VPN configuration other than the those necessary to connect to the one or more entity cloud services while the user device is operably connected to the one or more entity representatives.

2. The system of claim 1, wherein the computer-readable code is further configured to cause the at least one processing device to:

analyze the request to determine a device identifier and customer identification number; and access an entity database and retrieve resource transfer history data and resource account data for the customer identification number.

3. The system of claim 1, wherein the computer-readable code configured for generating, a VPN configuration for the user device is further configured to cause the at least one processing device to request device permissions on the user device to control one or more background applications.

4. The system of claim 1, wherein the computer-readable code is further configured to cause the at least one processing device to select a subset of the one or more entity representatives based on information contained in the request.

5. The system of claim 2, wherein the computer-readable code is further configured to cause the at least one processing device to select a subset of the one or more entity representatives based on the resource transfer history data and the resource account data identified using the customer identification number.

6. The system of claim 2, wherein the computer-readable code is further configured to cause the at least one processing device to select a subset of the one or more entity representatives using a machine learning engine trained to identify relevant entity representatives based on the resource transfer history data and the resource account data.

7. The system of claim 1, wherein the operable connection between the user device and the one or more entity representatives comprises the use of multiple channels of communication including video, audio, and text communication.

8. A computer program product for cloud-based virtual communication portals, the computer program product comprising a non-transitory computer-readable medium comprising code causing at least one processing device to:

receive a request from a user device to connect to one or more entity representatives;

receive and authenticate authentication credentials received from the user device;

generate a virtual private network (VPN) configuration for the user device;

generate a secure application programming interface (API) call from the user device to one or more entity cloud services based on information contained in the request to form an operable connection between the user device and the one or more entity representatives; and block all incoming or outgoing network connections on the user device via the VPN configuration other than the those necessary to connect to the one or more entity cloud services while the user device is operably connected to the one or more entity representatives.

9. The computer program product of claim 8 further comprises code causing the at least one processor to:

analyze the request to determine a device identifier and customer identification number; and access an entity database and retrieve resource transfer history data and resource account data for the customer identification number.

10. The computer program product of claim 8 further comprises code causing the at least one processor to request device permissions on the user device to control one or more background applications.

11. The computer program product of claim 8 further comprises code causing the at least one processor to select a subset of the one or more entity representatives based on information contained in the request.

12. The computer program product of claim 9 further comprises code causing the at least one processor to select a subset of the one or more entity representatives based on the resource transfer history data and the resource account data identified using the customer identification number.

13. The computer program product of claim 9 further comprises code causing the at least one processor to select a subset of the one or more entity representatives using a machine learning engine trained to identify relevant entity representatives based on the resource transfer history data and the resource account data.

14. The computer program product of claim 8, wherein the operable connection between the user device and the one or more entity representatives comprises the use of multiple channels of communication including video, audio, and text communication.

15. A method for cloud-based virtual communication portals, the method comprising:

receiving a request from a user device to connect to one or more entity representatives;

receiving and authenticating authentication credentials received from the user device;

generating a virtual private network (VPN) configuration for the user device;

generating a secure application programming interface (API) call from the user device to one or more entity cloud services based on information contained in the request to form an operable connection between the user device and the one or more entity representatives; and blocking all incoming or outgoing network connections on the user device via the VPN configuration other than the those necessary to connect to the one or more entity cloud services while the user device is operably connected to the one or more entity representatives.

16. The method of claim 15, wherein the method further comprises:

analyzing the request to determine a device identifier and customer identification number; and accessing an entity database and retrieve resource transfer history data and resource account data for the customer identification number.

17. The method of claim 15, wherein generating a VPN configuration for the user device further comprises requesting device permissions on the user device to control one or more background applications.

18. The method of claim 15 further comprising selecting a subset of the one or more entity representatives based on information contained in the request.

19. The method of claim 16 further comprising selecting a subset of the one or more entity representatives based on the resource transfer history data the resource account data identified using the customer identification number.

20. The method of claim 15, wherein the operable connection between the user device and the one or more entity representatives comprises the use of multiple channels of communication including video, audio, and text communication.

* * * * *